United States Patent [19]
Stiles et al.

[11] 3,968,091
[45] July 6, 1976

[54] LOW MELT INDEX ETHYLENE-VINYL ACETATE COPOLYMERS

[75] Inventors: Claude J. Stiles, Tuscola; Byford P. Hancock, Villa Grove, both of Ill.

[73] Assignee: National Distillers and Chemical Corporation, New York, N.Y.

[22] Filed: July 23, 1973

[21] Appl. No.: 381,651

Related U.S. Application Data

[63] Continuation of Ser. No. 150,712, June 7, 1971, abandoned.

[52] U.S. Cl. .......................... 528/503; 260/45.85 R; 260/45.95 L; 264/176 R
[51] Int. Cl.² ..................... C08F 6/00; C08F 218/08
[58] Field of Search ...... 260/87.3, 94.7 D, 94.7 GC, 260/96 D; 264/175, 176 R

[56] References Cited
UNITED STATES PATENTS

| | | | |
|---|---|---|---|
| 3,061,577 | 10/1962 | Pruett | 260/41 |
| 3,392,156 | 7/1968 | Donaldson | 260/88.1 |

FOREIGN PATENTS OR APPLICATIONS

| | | | |
|---|---|---|---|
| 851,553 | 10/1960 | United Kingdom | 260/87.3 |

*Primary Examiner*—Christopher A. Henderson, Jr.
*Attorney, Agent, or Firm*—Kenneth D. Tremain

[57] ABSTRACT

The melt index of ethylene-vinyl acetate copolymers is decreased by mechanically working the preformed copolymers.

9 Claims, No Drawings

LOW MELT INDEX ETHYLENE-VINYL ACETATE COPOLYMERS

This is a continuation of application Ser. No. 150,712, filed June 7, 1971 and now abandoned.

BACKGROUND OF THE INVENTION

Ethylene-vinyl acetate copolymers are well known and have a variety of uses. However, because the vinyl acetate acts as a modifier to some extent, it is not possible to synthesize copolymers having at least about 35% vinyl acetate and a sufficiently low melt index (as measured by ASTM D-1238-57T) for extrusion applications such as extrusion coating. The copolymers containing greater than 35% vinyl acetate start to lose crystallinity and cannot be produced below a melt index range of 4-6 in synthesis. At a vinyl acetate content of 40%, the minimum melt index in synthesis is 9.5-11.5.

It has now been found that the melt index of ethylene-vinyl acetate copolymers having a high content of vinyl acetate can be decreased to a level sufficient for extrusion applications by mechanically working the preformed copolymers at certain temperatures and for a limited amount of time. This result is particularly surprising because it is known that mechanically working polyethylene increases the melt index, see, e.g., U.S. Pat. No. 2,956,035 and U.S. Pat. No. 3,230,288, and it has been found that mechanically working ethylene-vinyl acetate copolymers containing 0.1% of butylated hydroxy toluene, a common antioxidant, increased the melt index.

SUMMARY OF THE INVENTION

This invention relates to a process for controlling the melt index of ethylene-vinyl acetate copolymers and more particularly, relates to a process for decreasing the melt index of a preformed ethylene-vinyl acetate copolymer to a predetermined value by mechanically working the copolymer under controlled conditions.

DESCRIPTION THE PREFERRED EMBODIMENTS

In accordance with the invention, the melt index of a preformed ethylene-vinyl acetate copolymer is decreased to a predetermined value by mechanically working the polymer. The copolymers employed and their preparation are well known. While copolymers having a vinyl acetate content of about 8–55 weight percent can be mechanically worked at controlled temperatures to reduce the melt index to desired levels, the invention finds particular utility in decreasing the melt index of copolymers having a large content of vinyl acetate, i.e., at least 35 weight percent.

The copolymer can be worked in any conventional polymer blending equipment that is capable of applying a high degree of mechanical working and high shear forces to the copolymer. Useful are Banbury mixers, which consist of a completely enclosed mixing chamber in which two spiral rotors spaced at adjustable distances from each other and revolving at opposite directions and at slightly different speeds can be employed. Also useful are continuous mixers, double-armed mixers, propeller type mixers, Lightnin' stirrers, melt homogenziers and the like. The mixers are equipped with means for heating the copolymer being worked.

The two main conditions contributing to melt index drop are peak (maximum) temperature attained during the working and the residence time at the peak working temperature. The peak temperature attained during working is maintained below the degradation point of the copolymer and is usually about 40–225°C., preferably about 100°–160°C. The decrease in melt index is directly affected by the maximum temperature employed. As a general rule the higher the maximum temperature, the greater the decrease in the melt index. The residence time at the maximum temperature is limited to a maximum of 5 minutes, and preferably about 3 – 5 minutes, because excessive time at the peak temperature can result in decomposition, vis breaking, and the like, which will increase rather than decrease the melt index.

The degree of shear imparted by the mechanical working can be adjusted to any desired degree as long as it does not cause degradation or decomposition of the copolymer. in such As a general rule, anti-oxidants should not be present during the mechanical working. As noted before, butylated hydroxy toluene at a concentration of 0.1% showed a 20% increase in melt index when a copolymer containing 40% vinyl acetate was mechanically worked at 305°F. However, if desired, anti-oxidants can be used to reduce the melt index drop but in such circumstances, the concentration of the anti-oxidant must be carefully controlled.

In the following examples, a preformed ethylene-vinyl acetate copolymer containing a specified amount of vinyl acetate was placed in a Banbury mixer and mechanically worked at the specified temperature for 5 minutes.

| Example | Weight Percent Vinyl Acetate | Working Temp., °F | Melt Index Before Working | Melt Index After Working | Percent Drop in Melt Index |
| --- | --- | --- | --- | --- | --- |
| 1 | 19.5 | 422 | 5.40 | 3.49 | 35.4 |
| 2 | 19.5 | 320 | 5.40 | 3.03 | 43.9 |
| 3 | 25.7 | 350 | 4.30 | 0.80 | 81.5 |
| 4 | 30.0 | 230 | 3.5 | 1.16 | 66.9 |
| 5 | 30 | 250 | 3.5 | 1.26 | 64.0 |
| 6 | 40 | 200 | 11.6 | 4.21 | 63.7 |
| 7 | 40.0 | 220 | 11.6 | 3.70 | 68.1 |
| 8 | 40 | 300 | 11.6 | 0.23 | 98.0 |
| 9 | 40.0 | 305 | 11.6 | 0.18 | 98.5 |
| 10 | 40* | 305 | 11.6 | 14.8 | −20.0 |
| 11 | 19.0 | 192 | 20.9 | 7.1 | 66.0 |
| 12 | 19.0** | 192 | 20.9 | 18.7 | 10.5 |

*contained 1000 ppm butylated hydroxy toluene
**contained 100 ppm 3,5-di-tert-butyl-hydroxy-hydrocinnimate (anti-oxidant)

The foregoing examples demonstrate that the melt index can be decreased to any desired value by adjusting the working temperature. Comparison of example 9 with example 10 and of example 11 with example 12 shows the adverse effect of anti-oxidants on the amount of decrease in melt index.

It will be recognized by those skilled in the art that various changes and modifications can be made in the process of this invention without departing from the spirit and the scope thereof. The various embodiments disclosed herein serve to further illustrate the invention but are not intended to limit it.

We claim:

1. A process for decreasing the melt index of preformed ethylene-vinyl acetate copolymers having about 8–55 weight percent vinyl acetate to a level sufficient for extrusion applications which comprises mechanically working a composition consisting essentially of the copolymer, at a peak temperature below the degradation temperature of the copolymer and for a maximum period of residence time at the peak temperature of 5 minutes.

2. The process of claim 1 wherein the copolymer contains at least 35 weight percent vinyl acetate.

3. The process of claim 2 wherein the peak temperature is about 40°–225°C.

4. The process of claim 3 wherein the residence time is 3–5 minutes.

5. The process of claim 4 wherein the copolymer contains about 40 weight percent vinyl acetate.

6. The process of claim 1 which consists essentially of mechanically working a composition consisting of the copolymer at a peak temperature below the degradation temperature of the copolymer and for a maximum period of residence time at the peak temperature of 5 minutes.

7. The process of claim 6 wherein the copolymer contains at least 35 weight percent vinyl acetate.

8. The process of claim 1 which consists of mechanically working a composition which consists of the copolymer at a peak temperature below the degradation temperature of the copolymer and for a maximum period of residence time at the peak temperature of 5 minutes.

9. The process of claim 8 wherein the copolymer contains at least 35 weight percent vinyl acetate.

* * * * *